UNITED STATES PATENT OFFICE.

CARL FRANZ EMIL GROSSE, OF BERLIN, GERMANY.

MARBLED GLASS.

SPECIFICATION forming part of Letters Patent No. 494,063, dated March 21, 1893.

Application filed May 12, 1892. Serial No. 432,763. (Specimens.)

*To all whom it may concern:*

Be it known that I, CARL FRANZ EMIL GROSSE, of Berlin, in the Kingdom of Prussia and German Empire, have invented new and useful Marbled Glasses, of which the following is a specification.

This invention relates to a marbled glass that has hitherto only been produced in smelting. The various colors required make this process very difficult and expensive thus limiting its application. Therefore this kind of glass is only used in the manufacture of high class hollow glass while it is not used for cheap hollow glass ware or as sheet glass thus excluding in the latter case its application for instance from the decoration of walls and ceilings.

The object of this invention is to overcome these disadvantages and to produce glass, which shall equal in appearance marble and other stones.

According to this invention the marbled appearance is not produced by coloring the whole body of the glass as at present in the smelting process, but by coloring its surface while the body may be of any color. The marble appearance is produced for cheap hollow ware by the glass blower in the course of his work.

As a ground color any color may be used but preferably an added or opaque color. This glass is manufactured as sheet glass in a furnace or placed on the pipe as usual and worked through the different stages into the various forms required. When the blower has brought the last charge to the pipe and has worked the mass regularly a finely pulverized glass flux is irregularly incorporated with it, by being either blown on the fluid mass by means of a blower or spread by means of a sieve or conjointly. When this has been done sufficiently the glass blower replaces the mass, which has been somewhat cooled in the meantime, into the furnace until the colored flux on the surface of the glass has become completely fluxed and glazed. When this has been done the blower finishes his work as usual. In the case of the manufacture of sheet glass the sheets are prepared and manipulated as in the usual manner, but before the last heating the colored flux is distributed over the surface of the sheet by a blower or sieve and after final heating the sheet is finished as usual.

By the various manipulations in the manufacture the flux on the surface of the glass is spread into the most varied and irregular forms or grain so that the result is the production of glass having a marbled surface fully equaling in appearance marble and other grained natural stones and even surpassing them as regards the diversity of the nature of the grain.

What I claim, and desire to secure by Letters Patent of the United States, is—

The herein described process for the manufacture of marbled or stone grained glass plates, consisting in blowing a pulverized colored glass flux upon the surface of a glass plate while said plate is in a soft condition and subsequently exposing said plate to furnace heat whereby the flux is disposed into irregularly grained or blazed figures forming an imitation of marble, granite or other stone, substantially as specified.

In witness whereof I have hereunto set my hand in presence of two witnesses.

CARL FRANZ EMIL GROSSE.

Witnesses:
 PAUL FISCHER,
 PAUL BRINKMAN.